US009396353B2

(12) United States Patent
Gao et al.

(10) Patent No.: US 9,396,353 B2
(45) Date of Patent: Jul. 19, 2016

(54) DATA ALLOCATION AMONG DEVICES WITH DIFFERENT DATA RATES

(71) Applicant: International Business Machines Corporation, Armonk, NY (US)

(72) Inventors: Meng Gao, Shanghai (CN); Yang Liu, Shanghai (CN); Mei Mei, Shanghai (CN); Jie Ping Wu, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/818,411

(22) Filed: Aug. 5, 2015

(65) Prior Publication Data
US 2015/0339491 A1 Nov. 26, 2015

Related U.S. Application Data

(63) Continuation of application No. 14/488,429, filed on Sep. 17, 2014, now Pat. No. 9,146,682.

(30) Foreign Application Priority Data

Sep. 29, 2013 (CN) .......................... 2013 1 0454982

(51) Int. Cl.
*G06F 3/06* (2006.01)
*G06F 21/62* (2013.01)
(52) U.S. Cl.
CPC ............ *G06F 21/6218* (2013.01); *G06F 3/061* (2013.01); *G06F 3/064* (2013.01); *G06F 3/068* (2013.01); *G06F 3/0608* (2013.01); *G06F 3/0611* (2013.01); *G06F 3/0631* (2013.01); *G06F 3/0646* (2013.01); *G06F 3/0683* (2013.01)

(58) Field of Classification Search
None
See application file for complete search history.

(56) References Cited

U.S. PATENT DOCUMENTS

| 8,315,995 | B1 | 11/2012 | Levy |
| 8,380,947 | B2 | 2/2013 | Chiu et al. |
| 2006/0218366 | A1 | 9/2006 | Fukuda et al. |

(Continued)

FOREIGN PATENT DOCUMENTS

CN 104516678 A 4/2015

OTHER PUBLICATIONS

Quantum Corp., "StorNext 4.0 Technical Product Brief," Product Brief, Quantum Corp., Jan. 2010, p. 1-12.

(Continued)

*Primary Examiner* — Ilwoo Park
(74) *Attorney, Agent, or Firm* — David Zwick; Randall J Bluestone

(57) ABSTRACT

An allocation instruction is received that includes a target data operand and a storage medium operand indicating a storage medium for storing the target data. A data dependency is identified that specifies metadata that includes access control information specifying which users have permission to perform a write operation to the file that includes the target data. In response to determining that the allocation instruction allocates the target data from a first storage medium to a second storage medium having a faster data IO rate, the allocation instruction is modified to also allocate the metadata specified in the data dependency to the second storage medium. In another aspect, the allocation instruction is modified to also allocate the metadata identified in the data dependencies to one or more storage mediums with data IO rates that are at least as fast as the second storage medium.

6 Claims, 3 Drawing Sheets

(56) References Cited

U.S. PATENT DOCUMENTS

| | | |
|---|---|---|
| 2009/0182957 A1 | 7/2009 | Yashiro |
| 2009/0287751 A1 | 11/2009 | Hasegawa et al. |
| 2011/0010514 A1 | 1/2011 | Benhase et al. |
| 2011/0202741 A1 | 8/2011 | Tajima et al. |
| 2012/0290779 A1 | 11/2012 | Eleftheriou et al. |
| 2013/0013561 A1 * | 1/2013 | Chan ............ G06F 17/30132 707/636 |
| 2013/0031298 A1 | 1/2013 | Tan et al. |
| 2013/0111129 A1 | 5/2013 | Maki et al. |
| 2013/0166839 A1 | 6/2013 | Burton et al. |
| 2013/0185256 A1 | 7/2013 | Alatorre et al. |
| 2015/0081964 A1 | 3/2015 | Kihara et al. |
| 2015/0095528 A1 | 4/2015 | Gao et al. |

OTHER PUBLICATIONS

Hitachi, "Hitachi Universal Storage Platform™ V and Hitachi Universal Storage Platform VM," Architecture Guide, Oct. 2008, p. 1-44, Hitachi Data Systems Corporation.

* cited by examiner

DATA ALLOCATION AMONG DEVICES WITH DIFFERENT DATA RATES

BACKGROUND

The present invention relates to data storage technology, and more specifically, to a method and apparatus for data storage.

Data IO rate is one of the main performance indicators of storage devices. Modern storage devices are generally heterogeneous storage devices, i.e., containing storage devices having different storage mediums. The most common storage medium is Hard Disk Drive (HDD) based on magnetic disk technology and Solid State Disk (SSD) based on flash memory technology. Data IO rates that may be supported by HDDs are limited by the rates of mechanical operations, such as disk rotation and magnetic head movement. SSD has much higher data IO rates than data IO rates of HDD because mechanical operations such as disk rotation and magnetic head movement are avoided. On the other hand, SSD has a higher cost than HDD, and thus may be merely suitable for storing smaller amounts of data. A storage device may further include a storage controller for controlling data allocation among different storage mediums.

For such heterogeneous storage devices, traditional optimization methods for homogeneous storage devices are not applicable. A homogeneous storage device has the same storage media, while a heterogeneous storage device has different storage mediums with significant performance and cost differences. Thus, it may be necessary to allocate data with different properties to different storage mediums based on a comprehensive consideration of data properties, storage medium performance, and costs of the storage mediums, to achieve balance between performance and cost, thereby improving storage efficiency. As a fundamental principle, a small amount of data having a higher access frequency should be stored on an SSD, and a large amount of data having a lower access frequency should be stored on an HDD. Whether specific data should be stored on SSD or HDD may be determined by a system administrator based on experience. In addition, with variances in the data access frequency, data may be reallocated between HDD and SSD, that is, data having a higher access frequency may be reallocated from HDD to SSD, and data having a lower access frequency may be reallocated from SSD to HDD.

Taking the complexity of data stored in a storage device into consideration, simply allocating data based on the above fundamental principle may not improve storage efficiency effectively. Thus, a new method for allocating data among different storage mediums of a storage device is desired.

SUMMARY

Embodiments of the present invention disclose a method, computer program product, and system for storing data. An allocation instruction is received that includes a target data operand and a storage medium operand indicating a storage medium for storing the target data. A data dependency is identified that specifies metadata that includes access control information specifying which users have permission to perform a write operation to the file that includes the target data. In response to determining that the allocation instruction allocates the target data from a first storage medium to a second storage medium having a faster data IO rate, the allocation instruction is modified to also allocate the metadata specified in the data dependency to the second storage medium.

In another aspect, in response to determining that the allocation instruction allocates the target data from a first storage medium to a second storage medium having a faster data IO rate and that not all of the metadata can be allocated to the second storage medium, the allocation instruction is modified to also allocate the metadata identified in the data dependencies to one or more storage mediums with data 10 rates that are at least as fast as the second storage medium.

BRIEF DESCRIPTION OF THE SEVERAL VIEWS OF THE DRAWINGS

Through more detailed description of some embodiments of the present disclosure in the accompanying drawings, the above and other objects, features, and advantages of the present disclosure will become more apparent, wherein the same reference numerals generally refer to the same component in the embodiments of the present disclosure.

DETAILED DESCRIPTION

When there are dependence relationships between data stored on a storage device, storage efficiency may not be effectively improved through simply allocating data having a higher access frequency to SSD. For example, assume that data block B is a flash copy of data block A, namely, before updating data block A, current values of data block A must be copied to data block B, and an instruction for updating data block A may only be executed after the completion of the copy operation. If data block A is read frequently, data block A may be allocated to SSD. However if data block A is not written frequently, data block B is neither read nor written frequently, and therefore may be allocated to HDD. Thus, when it is needed to write data to data block A, although data block A is located in SSD, because it is required to perform the writing operation on data block B, the actual writing speed may be not an expected writing speed result based on the data IO rate of the SSD, but is dependent on the data IO rate of the HDD.

This difference between the expected writing speed and the actual writing speed of data block A may cause a so-called contention issue. Particularly, because data block A is located on SSD, the storage controller expects that a first writing operation on data block A may be completed in a first shorter period of time according to the data IO rate of SSD, and a second writing operation on data block A may be started after the first period of time. However, in fact, the first writing operation on data block A may not be completed after the first period of time, and a conflict may arise if the second writing operation is performed on data block A at that point.

Data dependency may occur in other situations. For example, metadata needs to be identified and read before actual data updating of some applications. The metadata may be access control data, address mapping data, etc. Before writing a file, it must be confirmed whether a current user has permission to perform writing operations to this file. If the metadata with the user permission is stored on HDD, even if data of the file itself is stored on SSD, the actual writing speed of this file may be lower than an expected writing speed due to the reading of such metadata.

Figure 2:
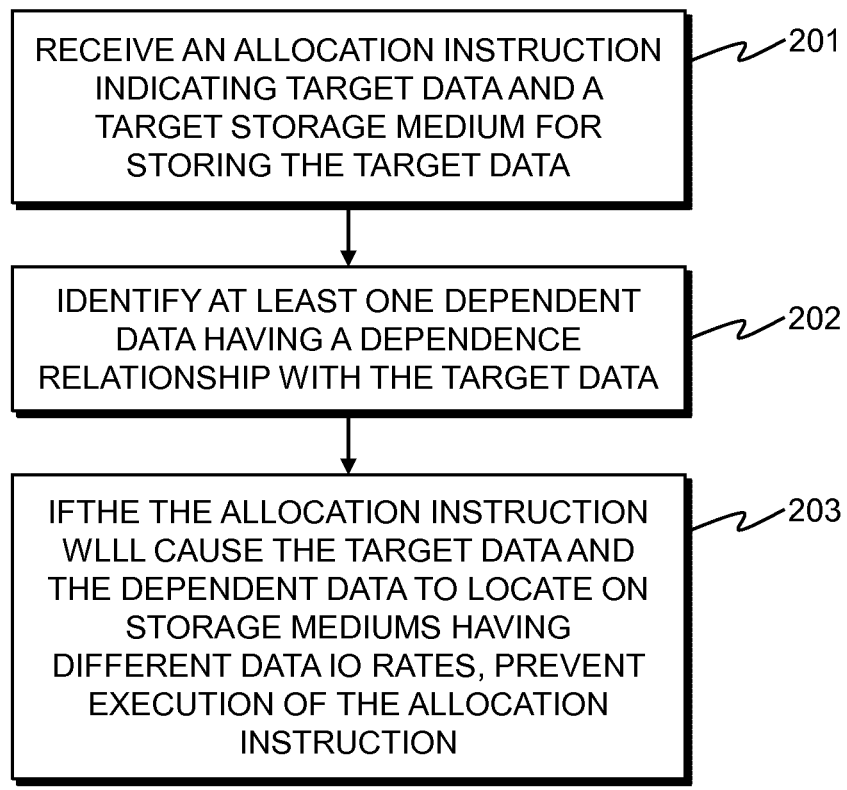
FIG. 2 is a flowchart of a method for storing data, in accordance with an embodiment of the present invention.

A method for storing data according to an embodiment of the invention will be described with reference to FIG. 2. In the following description, unless otherwise specified, a data block is equivalent to data stored in the data block.

At step 201, an allocation instruction may be read that indicates target data and a target storage medium for storing the target data.

In general, an allocation instruction includes at least two operands: a target data operand, and a target storage medium operand. If the allocation instruction is to store new data at a first storage location, the target data operand may contain the new data, and the target storage medium operand may contain the address of the first storage location. If the allocation instruction is to move or copy data that has been stored at a second storage location to a third storage location, the target data operand may contain the address of the second storage location, and the target storage medium operand may contain the address of the third storage location.

The allocation instruction may be a promotion allocation instruction for allocating target data to a high speed storage medium. Allocating the target data to a high speed storage medium such as SSD may be storing the target data to SSD initially. For example, installing an application on SSD through specifying an installation directory when the application is installed. Allocating target data to SSD may also be reallocating target data that is originally stored on HDD to SSD. For example, according to the above description, target data having a higher access frequency may be reallocated to SSD from HDD. The promotion allocation instruction may be from a storage optimization module on the storage device, or from an application server coupled to the storage device.

The allocation instruction may also be a demotion allocation instruction. The demotion allocation instruction may be used to allocate target data to a low speed storage medium. Allocating target data to a low speed storage medium such as HDD may be storing the target data to HDD initially, for example, installing an application on HDD through specifying an installation directory when the application is installed. Allocating the target data to HDD may be reallocating target data that is originally stored on SSD to HDD. For example, according to the above description, target data having a lower access frequency may be reallocated to HDD from SSD. The demotion allocation instruction may be from a storage optimization module on the storage device, or from an application server coupled to the storage device.

At step 202, at least one data dependency related to the target data is identified, wherein the at least one data dependency indicates data having a dependence relationship with the target data.

According to embodiments of the invention, each data dependency includes primary data and peripheral data. The primary data depends on the peripheral data. Those skilled in the art may appreciate that data stored in a data block may be used as primary data in a plurality of data dependencies. For example, assume that data block B is a flash copy of data block A, and access control data corresponding to data stored in data block A is stored in data block C. Before performing a writing operation on block A, it may be required to not only copy data stored in data block A to data block B, but also to read access control data from data block C. Accordingly, data in data block A depends on not only data in data block B, but also on data in data block C. In the data dependency between data stored in data block A and data stored in data block B, data stored in data block A is the primary data and data stored in data block B is the peripheral data. In the data dependency between data stored in data block A and data stored in data block C, data stored in data block A is the primary data and data stored in data block C is the peripheral data.

In the above example, each data dependency only includes one primary data and one peripheral data. In practice, each primary data may depend on a plurality of different peripheral data, and the data being depended on may further depend on other data. Those skilled in the art may appreciate that these complex scenarios may be resolved into a plurality of data dependencies that include only a single primary data and a single peripheral data as described above. Those skilled in the art may represent a dependence relationship in other forms, each of which however may be converted into a data dependency including only one primary data and one peripheral data as described above. Thus, in this application, descriptions of data dependencies will be of a single primary data and a single peripheral data.

The dependence relationship between the primary data and the peripheral data in a data dependency may be determined by the data itself. For example, the peripheral data may be a corresponding flash copy data of the primary data or the peripheral data may be metadata corresponding to the primary data. The dependence relationship may be specified by an application server as well. The dependence relationship may be determined through detecting specific instructions. For example, if an instruction for creating a flash copy between data block A and data block B is detected, it may indicate a data dependency including data block A and data block B should be created, wherein data block A is primary data, data block B is peripheral data. The specific instruction may be an instruction for explicitly creating a dependence relationship, i.e., indicating primary data and peripheral data explicitly. The dependence relationship may be identified through detecting a relationship between data access instructions. For example, if data block B is a flash copy of data block A, a writing instruction directed to data block A may necessarily invoke a writing instruction directed to data block B, indicating that a data dependency between data block A and data block B needs to be created.

In addition to indicating the primary data and the peripheral data, a data dependency may further include a condition required for dissolving the data dependency. According to an embodiment of the invention, the condition may be the occurrence of a specific event. For example, if an event of deleting a flash copy relationship occurs, a data dependency corresponding to the flash copy relationship should be dissolved. According to another embodiment of the invention, the condition may be a lifespan threshold of the data dependency.

At step 203, if the allocation instruction will cause the target data and the associated data to locate on storage mediums having different data IO rates, execution of the allocation instruction is prevented.

As described above, when there is a dependence relationship between data, simply allocating data having a high access frequency to a high speed storage medium or allocating data having a low access frequency to a low speed storage medium may not improve storage efficiency effectively. Thus, if the allocation instruction will cause the target data and the associated data to locate on storage mediums having different data IO rates, execution of the allocation instruction may be suspended. After that, different processing methods may be adopted for promotion and demotion allocation instructions respectively.

According to an embodiment of the invention, if the allocation instruction is a promotion allocation instruction, it may be modified to allocate associated data indicated by the data dependency to a high speed storage medium.

According to an embodiment of the invention, in a data dependency, data to be allocated to SSD is primary data. This may be because the access rate of primary data is limited by access rate of peripheral data, while access rate of peripheral data is not limited by access rate of primary data.

Assume that the allocation instruction read at step 201 is a promotion allocation instruction to allocate data block A having primary data stored thereon to SSD. After execution of the promotion allocation instruction, if data block B storing peripheral data is still located on HDD, access rate of data block A depends on the data IO rate of the HDD where data block B locates, instead of the data IO rate of the SSD where data block A locates. In this case, reallocating data block B on HDD to SSD may improve access rate of data block A from a level corresponding to the data IO rate of the HDD to a level corresponding to the data IO rate of the SSD.

In another example, assume that the allocation instruction read at step 201 is a promotion allocation instruction to allocate data block B having peripheral data stored thereon to SSD. This may be because data block B has a high enough access frequency or data block B is depended on by other data blocks. That is to say, the access to data block A is not a premise of the access to data block B. Thus, even if data block A having primary data stored thereon is located on the HDD due to its lower access frequency, access rate of data block B depends on the data IO rate of the SSD where data block B locates.

In practice, there may be a situation in which not all peripheral data depended on by the primary data may be allocated to the SSD. For example, the SSD has a free data capacity that is less than the amount of all of the peripheral data. In such a case, a prompt message may be given to indicate that executing the promotion allocation message may not improve access rate of the primary data.

According to embodiments of the invention, it is also possible to set different priorities for a plurality of data dependencies having the same target data as primary data. When it may be unable to allocate all peripheral data depended on by the primary data to SSD, which portions of peripheral data should be allocated to SSD may be determined according to their priorities. The priority may be determined according to a level of performance improvement resulting from allocating peripheral data to SSD. Herein, the performance improvement means improvement in access rate of primary data.

The priority may be determined according to the manner in which the primary data depends on the peripheral data. For example, assume that data block B is a flash copy of data block A, and access control data corresponding to data stored in data block A is stored in data block C. Also assume that a flash copying operation is necessary for each writing operation on data block A, and it is unnecessary to verify access permission for each writing operation on data block A. Thus, more performance improvement may be obtained through moving data block B from HDD to SSD than moving data block C from HDD to SSD. Thus, a data dependency composed of data block A and data block B may have a higher priority than a data dependency composed of data block A and data block C.

The priority may be determined according to the amount of the peripheral data. Moving a larger amount of peripheral data from HDD to SSD may bring about more performance improvement than moving a small amount of peripheral data from HDD to SSD. Thus, a data dependency corresponding to a larger data amount of peripheral data may have a higher priority than a data dependency corresponding to a smaller data amount of peripheral data.

HDD and SSD are described as the storage mediums in a storage device above as an example. Those skilled in the art will appreciate that HDD and SSD are merely examples of two storage mediums having different data IO rates, and there are many other storage mediums having different data IO rates. For example, a 7200 RPS HDD and a 10000 RPS HDD may be provided in a storage device. Because these two HDDs have different rotation speeds, they have different data IO rates as well. Embodiments of the invention are also applicable to such storage device.

For example, assume that there are three storage mediums having different access speeds, a 7500 RPS HDD, a 10000 RPS HDD, and an SSD, and assume that primary data and a plurality of peripheral data depended on by the primary data are all located on the 7500 RPS HDD initially. According to embodiments of the invention, if the primary data is allocated from the 7500 RPS HDD to the fastest SSD, when it is unable to allocate all of the peripheral data to the SSD, some of the peripheral data may be allocated to the SSD according to their priorities, and the remaining peripheral data may be allocated to the 10000 RPS HDD. Such allocation is also consistent with allocating data indicated by the data dependency to a high speed storage medium at step 203.

For an allocation instruction that is a demotion allocation instruction, if target data to be allocated to a low speed storage medium is peripheral data in a data dependency, and primary data in the data dependency is located on a high speed storage medium, after the demotion allocation instruction is prevented from executing, a message may be provided to indicate a reason for suspending the demotion allocation instruction.

As described above, the access speed of primary data may be limited by the access speed of peripheral data. Thus, if primary data in a data dependency is located on a SSD, and peripheral data in the data dependency is allocated to a HDD by the demotion allocation instruction, execution of the demotion allocation instruction may impact the access speed of the primary data. On the other hand, if the peripheral data in the data dependency is located on the SSD, and the primary data in the data dependency is allocated to the HDD by the demotion allocation instruction, because the access to the primary data is not a premise of the access to the peripheral data, execution of the demotion allocation instruction may not impact the access speed of the peripheral data.

According to another embodiment of the invention, after execution of the demotion allocation instruction is prevented, it is further detected whether the primary data in the data dependency is allocated to the low speed storage medium as well. If the primary data in the data dependency is allocated to the low speed storage medium as well, execution of the demotion allocation instruction is resumed.

Figure 3:
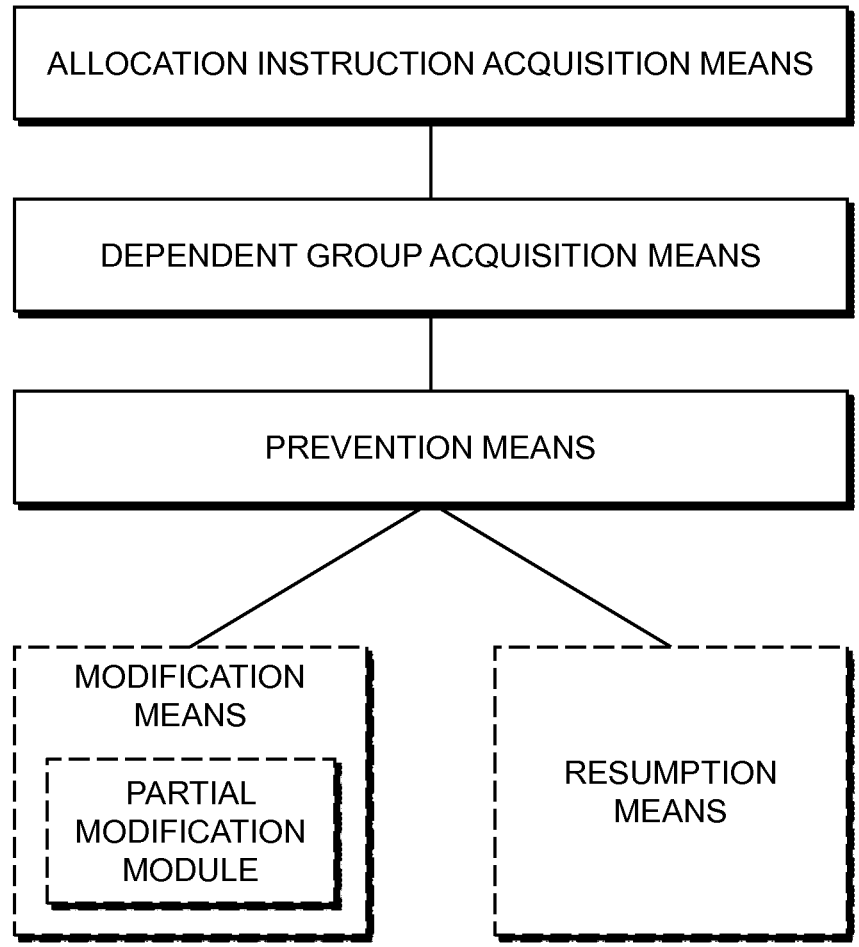
FIG. 3 is a block diagram of an apparatus for storing data, in accordance with an embodiment of the present invention.

FIG. 3 is a block diagram of an apparatus for storing data according to an embodiment of the invention. The apparatus for storing data may include an allocation instruction acquisition means configured to acquire an allocation instruction indicating target data and a target storage medium for storing the target data, a data dependency acquisition means configured to acquire at least one data dependency related to the target data, wherein the at least one data dependency each indicates associated data having a dependence relationship with the target data respectively, and wherein data used as primary data depends on data used as peripheral data in the data dependency, and a prevention means configured to prevent execution of the allocation instruction if the allocation instruction will cause the target data and the associated data indicated by the data dependency to locate on storage mediums having different data IO rates.

In certain embodiments, the allocation instruction is a promotion allocation instruction for allocating the target data to a high speed storage medium, and the apparatus further includes a modification means configured to modify the promotion allocation instruction so as to allocate associated data indicated by the data dependency to the high speed storage medium. In other embodiments, in the data dependency, the target data is used as primary data of the data dependency and the associated data is used as peripheral data of that data dependency.

In other embodiments, the data dependency acquisition means is configured to acquire a plurality of data dependencies, the plurality of data dependencies have the same target data as the primary data and the plurality of data dependencies have corresponding priority information respectively. Here, the modification means further includes a partial modification module, configured to, when it is unable to allocate all of the peripheral data on which the primary data depends to the high speed storage medium, modify the promotion allocation instruction so as to allocate the peripheral data indicated by some of the plurality of data dependencies with higher priorities to the high speed storage medium.

In certain embodiments, the high speed storage medium includes a first high speed storage medium and a second high speed storage medium, data IO rate of the first high speed storage medium being higher than the data IO rate of the second high speed storage medium, and wherein the promotion allocation instruction is used to allocate the target data to the first high speed storage medium. The partial modification module includes a module configured to modify the promotion allocation instruction so as to allocate some of the peripheral data with higher priority to the first high speed storage medium, and allocate the remaining peripheral data with lower priority to the second high speed storage medium. In various embodiments, the priority is determined according to a significant level of performance improvement resulted from allocating the peripheral data to the high speed storage medium, and the performance improvement means improvement in access speed of the primary data.

In some embodiments, the allocation instruction is a demotion allocation instruction for allocating the target data to a low speed storage medium, and the prevention means includes a module configured to, if the target data to be allocated to the low speed storage medium is the peripheral data of the data dependency and the primary data of the data dependency is located on the high speed storage medium, prevent execution of the demotion allocation instruction.

The apparatus may further include a resumption means, configured to, if it is detected that the primary data of the data dependency is allocated to the low speed storage medium as well, resume execution of the demotion allocation instruction. The data dependency may further indicate a condition for dissolving the data dependency.

Figure 1:
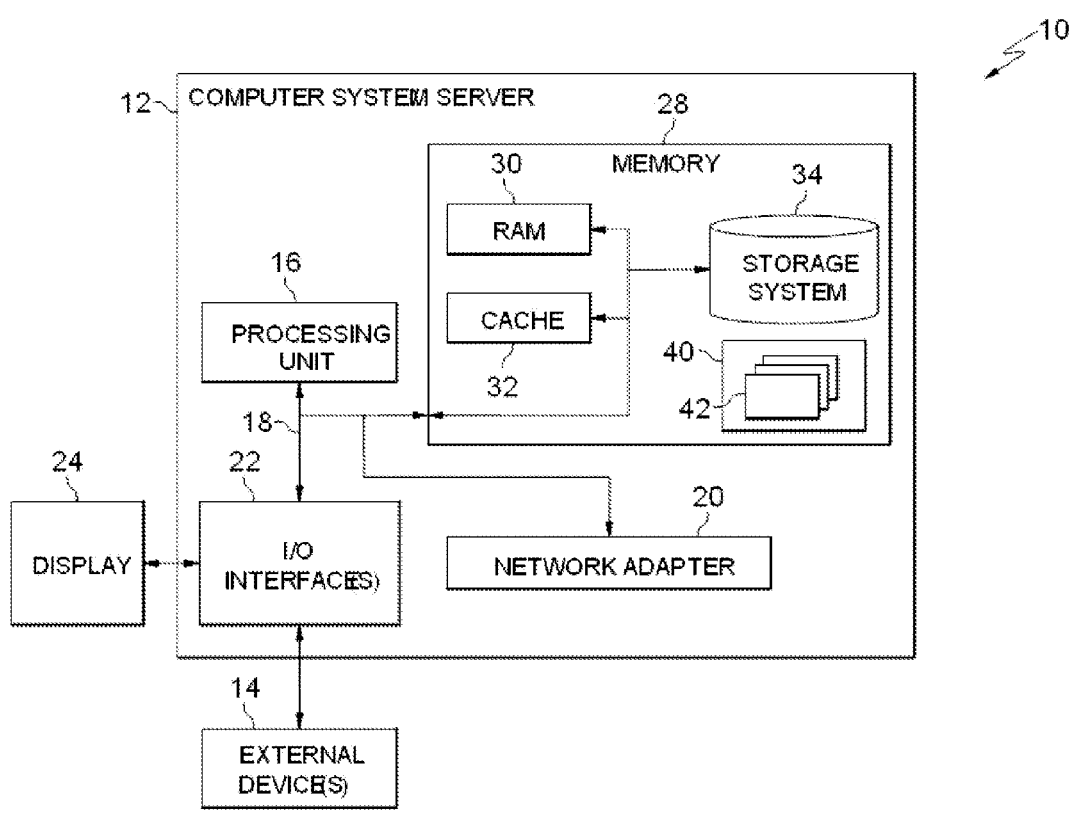
FIG. 1 shows an exemplary computer system/server in accordance with an embodiment of the present invention.

The apparatus according to an embodiment of the invention may be typically implemented as a computer program running on the exemplary computer system shown in FIG. 1. Although a hardware structure of a general computer system is shown in FIG. 1, the computer program when running on this computer system to realize solutions of the embodiment of the invention may turn the computer system/server from a general computer system/server into an apparatus embodying the invention.

In addition, although generally the apparatus according to embodiments of the invention is realized by a general computer system, various means or modules constructing the system may be implemented in essence by discrete hardware elements. This may be because the general computer, when running the computer program, always implements the various means or modules in a time division manner or through sharing processor cores. Taking a time-division implementation as an example, at a particular time, the general computer system may be used as hardware dedicated to realizing particular means or a module; at different times, it may be used as hardware dedicated to realizing different means or modules. Thus, the apparatus according to the embodiment of the invention may be a combination of a series of means or modules in hardware, and thus is by no means a framework of functional modules. On the other hand, the apparatus according to the embodiment of the invention may be conceived as physical apparatus for implementing the solution of the embodiment according to the invention in hardware.

The above solution may be also implemented in software by a plurality of discrete modules, each module having storage and computing resources provided separately, for example, each module implemented by a small scale special computing chip, such as a single-chip microcomputer. According to an embodiment of the invention, in general, these modules operate according to a temporal order, and thus may be implemented on a general computing system in a time-division manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing data, the method comprising:
    receiving an allocation instruction that includes a target data operand and a storage medium operand indicating a storage medium for storing the target data;
    identifying a data dependency that specifies metadata that includes access control information specifying which users have permission to perform a write operation to the file that includes the target data;
    in response to determining that the allocation instruction allocates the target data from a first storage medium to a second storage medium having a faster data IO rate, modifying the allocation instruction to also allocate the metadata specified in the data dependency to the second storage medium; and in response to determining that the allocation instruction allocates the target data from a first storage medium to a second storage medium having a faster data IO rate and that not all of the metadata can be allocated to the second storage medium, modifying the allocation instruction to also allocate the metadata identified in the data dependencies to one or more storage mediums with data IO rates that are at least as fast as the second storage medium.

2. The method according to claim 1, wherein the data dependency further identifies a condition for dissolving the data dependency.

3. A computer program product for storing data, the computer program product comprising:

one or more non-transitory computer readable storage media and program instructions stored on the one or more non-transitory computer-readable storage media, the program instructions comprising:

program instructions to receive an allocation instruction that includes a target data operand and a storage medium operand indicating a storage medium for storing the target data;

program instructions to identify a data dependency that specifies metadata that includes access control information specifying which users have permission to perform a write operation to the file that includes the target data;

program instructions, in response to determining that the allocation instruction allocates the target data from a first storage medium to a second storage medium having a faster data IO rate, to modify the allocation instruction to also allocate the metadata specified in the data dependency to the second storage medium; and program instructions, in response to determining that the allocation instruction allocates the target data from a first storage medium to a second storage medium having a faster data IO rate and that not all of the metadata can be allocated to the second storage medium, to modify the allocation instruction to also allocate the metadata identified in the data dependencies to one or more storage mediums with data IO rates that are at least as fast as the second storage medium.

4. The computer program product according to claim 3, wherein the data dependency further identifies a condition for dissolving the data dependency.

5. A computer system for storing data, the computer program system comprising:

one or more computer processors, one or more computer readable storage media, and program instructions stored on one or more of the computer-readable storage media for execution by at least one of the one or more processors, the program instructions comprising:

program instructions to receive an allocation instruction that includes a target data operand and a storage medium operand indicating a storage medium for storing the target data;

program instructions to identify a data dependency that specifies metadata that includes access control information specifying which users have permission to perform a write operation to the file that includes the target data;

program instructions, in response to determining that the allocation instruction allocates the target data from a first storage medium to a second storage medium having a faster data IO rate, to modify the allocation instruction to also allocate the metadata specified in the data dependency to the second storage medium; and program instructions, in response to determining that the allocation instruction allocates the target data from a first storage medium to a second storage medium having a faster data IO rate and that not all of the metadata can be allocated to the second storage medium, to modify the allocation instruction to also allocate the metadata identified in the data dependencies to one or more storage mediums with data IO rates that are at least as fast as the second storage medium.

6. The computer system according to claim 5, wherein the data dependency further identifies a condition for dissolving the data dependency.

* * * * *